US010846756B2

(12) United States Patent
Varippyreddy et al.

(10) Patent No.: US 10,846,756 B2
(45) Date of Patent: Nov. 24, 2020

(54) SEARCH RESULT-BASED LISTING GENERATION IN A SINGLE VIEW

(71) Applicant: eBay Inc., San Jose, CA (US)

(72) Inventors: Srinivasan Varippyreddy, Fremont, CA (US); James Trueheart Taylor, San Jose, CA (US)

(73) Assignee: eBay Inc., San Jose, CA (US)

( * ) Notice: Subject to any disclaimer, the term of this patent is extended or adjusted under 35 U.S.C. 154(b) by 340 days.

(21) Appl. No.: 15/703,783

(22) Filed: Sep. 13, 2017

(65) Prior Publication Data

US 2019/0080023 A1 Mar. 14, 2019

(51) Int. Cl.
*G06F 16/9038* (2019.01)
*G06F 16/9535* (2019.01)
*G06Q 30/06* (2012.01)
*G06F 3/0482* (2013.01)
*G06Q 30/02* (2012.01)
(Continued)

(52) U.S. Cl.
CPC ....... *G06Q 30/0276* (2013.01); *G06F 16/248* (2019.01); *G06F 16/9038* (2019.01); *G06F 16/9535* (2019.01); *G06Q 30/0601* (2013.01); *G06Q 30/0621* (2013.01); *G06F 3/0482* (2013.01)

(58) Field of Classification Search
CPC .................................................. G06Q 30/0276
See application file for complete search history.

(56) References Cited

U.S. PATENT DOCUMENTS 7,599,938 B1 * 10/2009 Harrison, Jr. .......... G06Q 30/02
705/7.29
8,024,235 B2 * 9/2011 Mathew ................ G06F 16/242
705/26.81
(Continued)

FOREIGN PATENT DOCUMENTS

WO 2019/055238 A1 3/2019

OTHER PUBLICATIONS

Hochheiser, Harry, and Ben Shneiderman. "Performance benefits of simultaneous over sequential menus as task complexity increases." International Journal of Human-Computer Interaction 12.2 (2000): 173-192. (Year: 2000).*

(Continued)

*Primary Examiner* — William Spieler
(74) *Attorney, Agent, or Firm* — SBMC

(57) ABSTRACT

Search result-based listing generation in a single view is described. Initially, search query input is received via a user interface and, as it is received, a listing system presents obtained search results via the user interface. The listing system supports generation of listings from search results, in part, by employing a listing schema that defines attributes for listings. Responsive to selection of a search result, for instance, the listing system identifies information of the selected search result corresponding to these attributes. The listing system then configures the user interface to present, concurrently with the search results, a listing template with this information. These listing templates are the basis for generating listings exposed to client devices by a distribution platform. Responsive to input to submit a listing, for instance, the listing system forms the listing from the information in the listing template and communicates the listing to the distribution platform.

20 Claims, 12 Drawing Sheets

(51) Int. Cl.
*G06F 16/24* (2019.01)
*G06F 16/248* (2019.01)

(56) References Cited

U.S. PATENT DOCUMENTS

| | | | | |
|---|---|---|---|---|
| 8,818,880 | B1* | 8/2014 | Sachan | G06Q 30/02 705/26.1 |
| 8,996,509 | B1* | 3/2015 | Sundaram | G06F 16/9535 707/722 |
| 2002/0038282 | A1* | 3/2002 | Montgomery | G06Q 40/04 705/37 |
| 2007/0050351 | A1* | 3/2007 | Kasperski | G06F 16/951 |
| 2008/0004992 | A1* | 1/2008 | King | G06Q 30/06 705/26.62 |
| 2011/0231291 | A1 | 9/2011 | Yankovich et al. | |
| 2014/0279161 | A1* | 9/2014 | Friedman | G06Q 30/08 705/26.3 |
| 2014/0280007 | A1 | 9/2014 | Gardner et al. | |
| 2015/0142851 | A1* | 5/2015 | Gupta | G06F 16/9032 707/779 |

OTHER PUBLICATIONS

International Search Report for PCT Application No. PCT/US2018/049223, dated Nov. 6, 2018, 5 pages.
International Written Opinion for PCT Application No. PCT/US2018/049223, dated Nov. 6, 2018, 9 pages.
Ivinternational Preliminary Report on Patentability received for PCT Application No. PCT/US2018/049223, dated Mar. 26, 2020, 9 pages.

\* cited by examiner used fitness equipment

1200 LBS. Bumper Plates
Varying Condition, Well Maintained
Listing Details – Nomad, HD Bumper, Black Description – 1200lb assorted bumper plates, high density rubber, well maintained, but some wear.

45 LB. Barbell
Decent Condition, Well Maintained
Item Details – Nomad, US Standard, 45LB Description – Standard 45lb barbell, center knurling, heavily used since 2011, well maintained.

Row Machines
Decent Condition, Well Maintained
Listing Details – Idea3, Super Class Description – Standard row machine for high intensity interval training (HIIT) workouts.

15 LB. Slam Ball
Poor Condition
Item Details – Nomad, Heavy Duty

Description – 15lb Slam Ball (at least it was), small

--- srini2k17 ▶

1200 LBS. Bumper Plates
Listed by *srini2k17*
Lister Rating ☆☆☆☆☆ (5 stars)
Varying Condition, Well Maintained
Item Details
Brand ▶  Style ▶  Color ▶
Description
13× assorted bumper plates, high density rubber, well maintained, but some wear.

*...ting*
...high density rubber, well maintained, but some wear.

Suggested Range $300.00-$600.00

SUBMIT

Fig. 9

SEARCH RESULT-BASED LISTING GENERATION IN A SINGLE VIEW

BACKGROUND

Service provider systems continue to make advances in computing technologies to enable listings for various products and services to be surfaced to client devices. With these advances, an increasing number of service provider systems and associated applications surface listings to client devices for the various products and services. Example products and services for which such listings are surfaced include consumer products (new and used), real property, property rentals, service offerings (e.g., house cleaning, babysitting, landscaping, etc.), classified offerings, and so on. In addition to advances in technologies for surfacing listings, service provider systems also continue to make advances in computing technologies for generating these listings.

Conventional techniques for generating such listings typically involve client devices accessing different data and performing a different series of steps in connection with each platform to which the listings are submitted. However, this may consume a significant amount of hardware resources of the client devices to store information for generating these listings for the different listing platforms. Leveraging different data and performing a different series of steps for each platform may also be time consuming for users of the client devices. This is, in part, because client device users interested in submitting listings to different listing platforms may need to learn intricacies of the listing generation process to submit listings with each platform. As a result, listing platforms simply may not be leveraged in many scenarios.

SUMMARY

To overcome these problems, search result-based listing generation in a single view is leveraged. Initially, search query input is received via a user interface, e.g., for a product or service similar to one a user wishes to list using a listing system. As the search query input is received, the listing system presents obtained search results via the user interface. The listing system supports the generation of listings from the search results, in part, by employing a listing schema, which is a set of rules defined for controlling attributes of listings. Responsive to user selection of a presented search result, for instance, the listing system identifies information associated with the selected search result that corresponds to the attributes of the listing schema.

The listing system also configures the user interface to present, concurrently with the search results, a listing template that is populated with the identified information. In general, this listing template serves as a basis for generating a listing for exposure to client devices by a distribution platform, such that when the listing system receives input to submit the listing, the listing system generates the listing from the information in the listing template. The listing system also enables the information in the listing template to be modified using attribute modification instrumentalities. In this way, the listing system generates listings that accurately reflect the products or services listed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 9 depicts a further example implementation in which input is received to modify the information in a listing template of the combined search result and listing template view.

DETAILED DESCRIPTION

Overview

Figure 1:
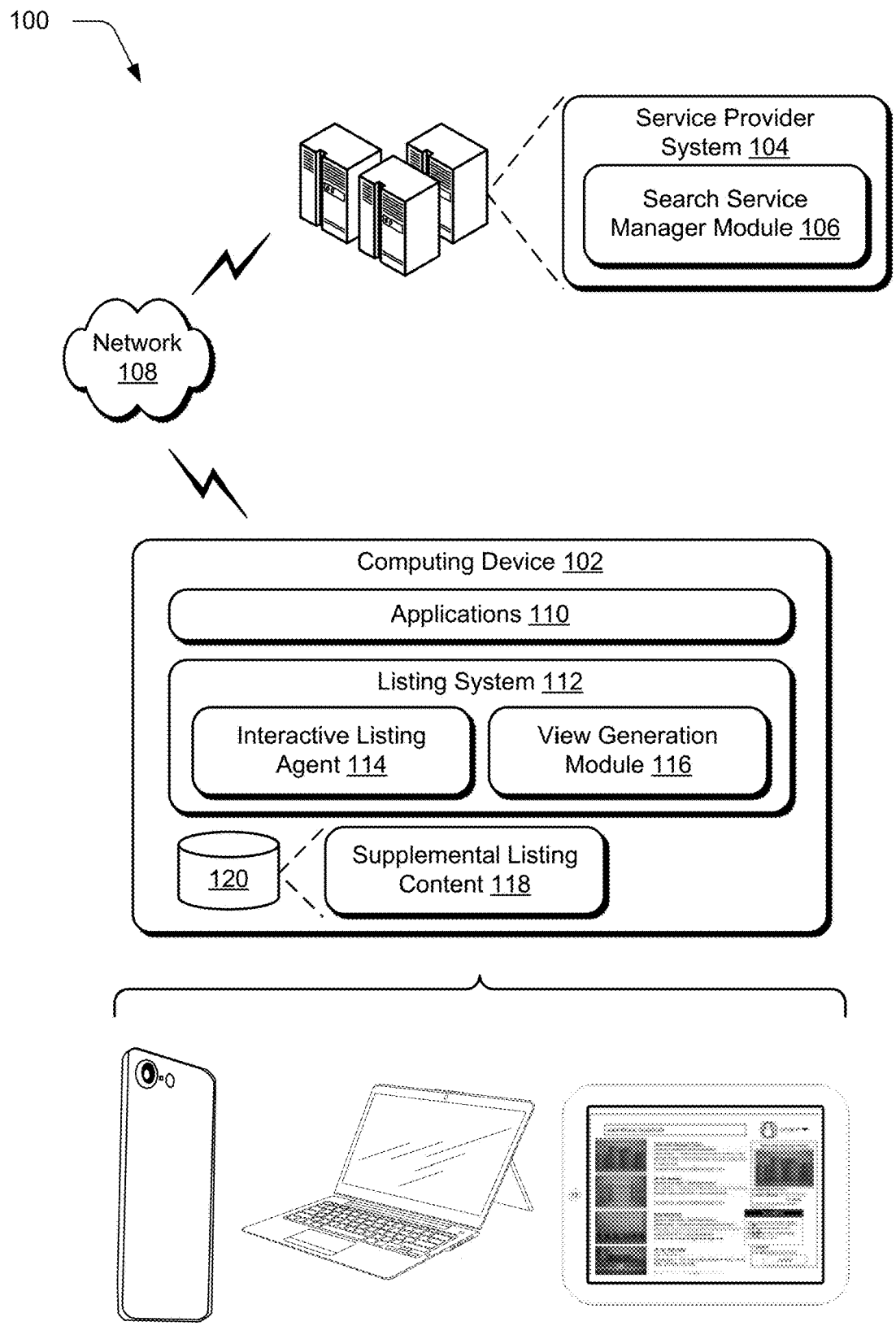
FIG. 1 is an illustration of an environment in an example implementation that is operable to employ techniques described herein.

An increasing number of service provider systems and associated applications surface listings to client devices for various products and services due to advances in computing technologies. Service provider systems also continue to make advances in computing technologies for generating these listings. Conventional techniques for generating such listings typically involve client devices accessing different data and performing a different series of steps in connection with each platform to which the listings are submitted. However, this may consume a significant amount of hardware resources of the client devices to store information for generating these listings for the different listing platforms. Leveraging different data and performing a different series of steps for each platform may also be time consuming for users of the client devices. This is, in part, because client device users interested in submitting listings to different listing platforms may need to learn intricacies of the listing generation process to submit listings with each platform. As a result, listing platforms simply may not be leveraged in many scenarios.

To overcome these problems, search result-based listing generation in a single view is leveraged. Initially, search query input is received via a user interface, e.g., for a product or service similar to one a client device user wishes to list using a listing system. As the search query input is received, the listing system presents obtained search results via the user interface. By presenting these search results, the listing system aids the client device user in determining listings similar to the product or service the user is listing and also determining the information to include in a listing. Broadly speaking, the listing system supports the generation of listings from the search results, in part, by employing a listing schema, which is a set of rules defined for controlling attributes of listings. As one example of this control, the listing service may present the search results as listings configured according to the schema, such that the search result listings are each presented in a similar format with information corresponding to the attributes of the schema. For instance, each search result listing is presented with a title, an image, a description, and so forth.

In accordance with the described techniques, these search result listings are selectable to present, concurrently in the user interface with the search result listings, a listing template. This listing template is initially populated with information from the selected listing. In particular, the listing template is populated with the information from the selected search result listing that corresponds to the attributes of the schema. Broadly, listing templates serve as a basis for generating listings for exposure to client devices by a distribution platform, such that when the listing system receives a listing submission input, the listing system forms the listing from the information in the listing template. To this extent, in scenarios where the client device user does not provide input to modify the information of the listing template, the listing system generates a listing that is substantially the same as the selected search result listing. In one or more implementations, the selected search result listing and the generated listing merely have different listing user information, e.g., username of the listing user, rating of the listing user, contact information of the listing user, and so on.

Nonetheless, the listing template is modifiable. In particular, the listing template is configured with attribute modification instrumentalities that allow a client device user to modify the information in the listing template. By way of example, the listing system may receive a hover input over a description of the listing template. Responsive to this, the listing system causes an attribute modification instrumentality to be displayed that enables modification of the listing template's description. Once the modification is complete, the listing template is presented with the modified description. Certainly, the listing system enables other information of the listing template to be modified as described in more detail below. This allows client device users to customize listings. Indeed, in scenarios where the client device user does provide input to modify the information of the listing template, the listing system generates a listing in accordance with the modifications.

By configuring the listing template with information from a selected search result, the listing system reduces a burden on client device users to create listings from scratch. Additionally, presenting search results in a same view as the listing template enables client device users to refer to these search results while making modifications to the listing template. The listing system therefore enables client device users to identify information for a listing that may be expected in connection with a product or service being listed. The listing system also enables client device users to identify information for a listing that may result in more interactions by other client device users—and potentially lead to conversion. By configuring listing information according to a schema, the listing system also improves an efficiency of client devices. This is because search results from different sources (e.g., electronic commerce distribution platforms) can be handled by the client devices in a similar manner. The described techniques also improve an efficiency of, and reduce resources used by, distribution platforms because the information included in the listings these platforms receive is standardized, e.g., according to the schema.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ search result-based listing generation in a single view as described herein. The illustrated environment 100 includes a computing device 102 and a service provider system 104 with a search service manager module 106. The computing device 102 and the service provider system 104 are communicatively coupled, one to another, via a network 108.

Computing devices that are usable to implement the computing device 102 and the service provider system 104 may be configured in a variety of ways. A computing device, for instance, may be configured as a desktop computer, a laptop computer, a mobile device (e.g., assuming a handheld configuration such as a tablet or mobile phone), and so forth. Thus, computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 11.

As noted above, the service provider system 104 is illustrated as including the search service manager module 106 that is implemented at least partially in hardware of the service provider system 104 to provide services accessible via the network 108 to client devices, such as the computing device 102. In particular, the search service manager module 106 represents functionality to interact with applications 110 of the computing device 102 to implement search result-based listing generation in a single view. The applications 110 may include a browser, a network-enabled application, and so on, that obtain data from the service provider system 104 via the network 108. The search service manager module 106, for instance, may interact with one of the applications 110 to receive search query input, conduct a search based on the received query (e.g., using web indexing, a web crawler, etc.), return search results for presentation via the application 110, and so forth.

In addition or alternately, the service provider system 104 may include functionality to obtain listing information from the computing device 102. Once this listing information is obtained, the service provider system 104 exposes generated digital content via a distribution platform in connection with the obtained information. For instance, the service provider system 104 exposes digital content configured as a listing-for-sale via an electronic commerce platform, e.g., eBay®. Although a single service provider system 104 is depicted in the illustrated example 100, the computing device 102 is configured to access multiple service providers over the network 108 to leverage their respective services, such as a first service provider for performing searches based on search query input and a second service provider for exposing listings based on obtained listing information.

To implement search result-based listing generation in a single view, the computing device 102 also includes listing system 112, which is illustrated having interactive listing agent 114 and view generation module 116. In general, the listing system 112 illustrates functionality to obtain search results based on search query input, generate a listing template based on a user selected search result, and present the template in a same view (e.g., a same application window) as the search results are presented. In this way, the listing system 112 maintains a context of the listings that are presented based on search query input and simultaneously allows a user to modify the listing template. In one or more implementations, the listing system 112 may be associated with a service provider system that provides the search results to the computing device 102 and also exposes listings generated according to the described techniques. Additionally or alternatively, the listing system 112 may be implemented to supplement an application (e.g., as a browser plugin or toolbar), such that functionality of the listing system 112 can be used in connection with search results corresponding to different service provider systems as well as with a service provider capable of exposing listings. Initially, though, the listing system 112 generates the above-noted listing template to include data identified by processing a selected search result.

In this context, the interactive listing agent 114 represents functionality to modify the information of the template and create a customized listing based, in part, on user input received via instrumentalities of the template. The view generation module 116 represents functionality to generate the combined search result and listing template view based on a variety of information, such as search result data, information obtained by the interactive listing agent 114 about a selected search result, information obtained by the interactive listing agent 114 due to one or more user modifications of the information in the template, and so on. Indeed, the listing system 112 may include more or fewer modules to carry out its functionality without departing from the spirit or scope of the techniques described herein.

In the illustrated example, the computing device 102 also includes supplemental listing content 118. The supplemental listing content 118 is illustrated stored in storage 120 of the computing device 102. In general, the supplemental listing content 118 represents digital content that is accessible to the computing device 102, e.g., via the device applications 110. The supplemental listing content 118 can include any of a variety of content types, such as images, videos, documents, audio recordings, graphics, proprietary content types, and so forth. In general, the supplemental listing content 118 can be accessed by the listing system 112 to supplement a listing being created.

Consider an example in which the interactive listing agent 114 extracts a digital image from a selected search result listing and in which the view generation module 116 generates the listing template to include the extracted image. As noted above, the presented listing template includes instrumentalities that allow a user to modify the information in the listing template, including images. Given this, the user may provide input in relation to an instrumentality that allows the image of the listing template to be changed, e.g., so that the created listing includes a digital image of the actual object that is to be listed. Based on selection of a digital image from the supplemental listing content 118, the interactive listing agent 114 modifies listing data associated with the listing template. The view generation module 116 also updates the listing template to present the user-selected image. Other types of the content may be added to a listing (e.g., video or audio) without departing from the spirit or scopes of the techniques described herein.

As discussed in more detail below, once a user is satisfied with the information indicated by the listing template, the user may select an instrumentality of the template to submit the listing. As part of doing so, the interactive listing agent 114 generates listing data to describe the listing. This listing data may include, for instance, a title of the listing, a description of the one or more items being listed, an image, condition of the one or more items, and so forth. In any case, the listing data is configured for communication to a service provider that is capable of exposing digital content corresponding to the listing data.

By presenting search results and a listing template in a single view, the listing system 112 allows computing device users to refer to information of other listings while providing input to the listing system 112 to create new listings. One advantage of the listing system 112 is therefore that users are presented the actual words, images, and even prices used by other users (or by businesses) when attempting to list a particular product or service. By generating the listing template to include the information of a selected search result listing, the listing system 112 also reduces an amount of time computing device users spend listing items with a listing service, e.g., an electronic commerce platform, a property rental platform, a platform for requesting services (e.g., house cleaners, babysitters, nannies, landscapers, lawn mowers, information technology providers, etc.), and so forth. This is because the information (e.g., images, descriptions, titles, etc.) of a similar listing or a listing associated with a same product or service can be leveraged to populate the listing template. The described techniques also improve an efficiency of, and reduce resources used by, listing service provider systems because at least some of the information included in the listings is standardized, as described in more detail below.

Having considered an example environment, consider now a discussion of some example details of the techniques for search result-based listing generation in a single view in accordance with one or more implementations.

Search Result-Based Listing Generation in a Single View

Figure 2:
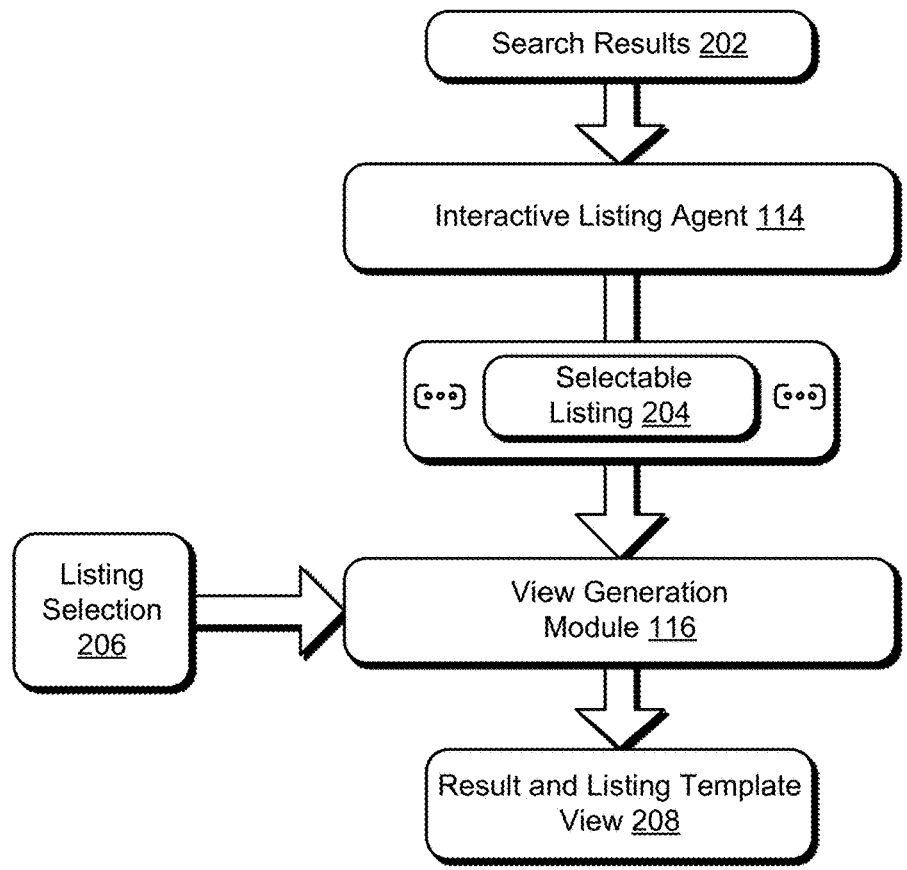
FIG. 2 depicts an example implementation in which a listing system of FIG. 1 generates a combined search result and listing template view for output.

FIG. 2 depicts a system in an example implementation 200 in which operation of the interactive listing agent 114 and the view generation module 116 is described in more detail as generating a combined search result and listing template view for output.

The interactive listing agent 114 and the view generation module 116 are incorporated as part of a system to generate a combined search result and listing template view. The interactive listing agent 114 is illustrated obtaining search results 202, which may be obtained from a search provider, such as one implemented using the search service manager module 106. The search results 202 are obtained based on search query input, such as a search query input received via an interface instrumentality of one of the applications 110. By way of example, the search query input may correspond to a text query received via a text field, an audible query received via an audio interface (e.g., microphone) of the computing device 102, an image query comprising a digital image captured using image capturing functionality of the computing device 102 and maintained in the storage 120, and so forth.

Regardless of the query type, the search results 202 represent a response to the search query. The search results 202 may correspond to various listings from an electronic commerce site, listings of products or services from a business's website, listings of products or services on different websites, listings of rentals from a rental service, and so on. In one or more implementations, the search results 202 may update as search result input is received. By way of example, as a user types the text string "used fitness equipment" the search results 202 obtained may update such that the search results 202 obtained when the text string "used" is typed into a text field are different from the search results 202 obtained when the text string "used fitness equip" is typed into the text field.

Based on the search results 202, the interactive listing agent 114 is configured to generate a selectable listing 204. The selectable listing 204 is depicted with ellipses to indicate that the search results may correspond to more than one listing. Indeed, the search results 202 may correspond to several listings depending on the availability of the searched-for products or services. In one or more implementations, the interactive listing agent 114 generates the selectable listing 204 by processing the data associated with a respective search result, identifying the processed data that corresponds to defined attributes for a listing, and populating the attributes of the selectable listing 204 with the identified data. The interactive listing agent 114 is configured to do this for each listing corresponding to the search results 202. In addition or alternately, the search results 202 may already be configured according to the defined attributes, e.g., when the search results 202 are obtained from a search service provider associated with the listing system 112. In this scenario, the interactive listing agent 114 may simply pass the search results 202 configured as selectable listings to the view generation module 116. Further still, the interactive listing agent 114 may not configure selectable listings 204 according to the defined attributes until selected by a user selection input.

Nonetheless, the view generation module 116 obtains the selectable listings 204. Based on the selectable listings 204, the view generation module 116 generates an interface (e.g., a view) for output via which the selectable listings 204 are selectable. This view may be configured as an interactive display that displays the selectable listings 204 in a list format and relative to which a user selection input (e.g., touch input, mouse input, keyboard input, etc.) can be received to select a particular listing. Alternately or in addition, an audio selection input (e.g., a voice command) can be received to select a particular listing. Regardless of the particular manner in which the selectable listings 204 are presented, listing selection 206 is received by the view generation module 116 to select one of the selectable listings 204 presented.

Based on the listing selection 206, the view generation module 116 updates the view via which the selectable listings 204 are presented to form result and listing template view 208. The result and listing template view 208 includes both the selectable listings 204 presented for selection and also a listing template. This listing template is initially populated with the information of the selectable listing 204, which was selected according to the listing selection 206. By way of example, the listing template may include an image copied from the selected listing, a title copied from the selected listing, a description copied from the selected listing, and so on. In particular, the listing template includes data corresponding to the defined attributes of a listing. As noted above, the interactive listing agent 114 is configured to identify these attributes. Further, the interactive listing agent 114 is configured to generate listing data for the listing template. This generated listing data initially includes the information identified by the interactive listing agent 114 as corresponding to the defined attributes of a listing. In addition to this information, the interactive listing agent 114 determines other listing data corresponding to the defined attributes of a listing. Examples of this other data include, but are not limited to, an identifier of the user associated with the listing, a rating of the user associated with the listing (e.g., indicating a responsiveness of the user, an accuracy of the user's descriptions, timeliness of the user, and so on), payment information of the user associated with the listing, and so forth.

Based on the listing data determined by the interactive listing agent 114, the view generation module 116 generates the result and listing template view 208 having the listing template. Once the listing template is presented, inputs can be received via instrumentalities of the result and listing template view 208 to modify the listing data associated with the listing template. In this context, consider FIG. 3.

Figure 3:
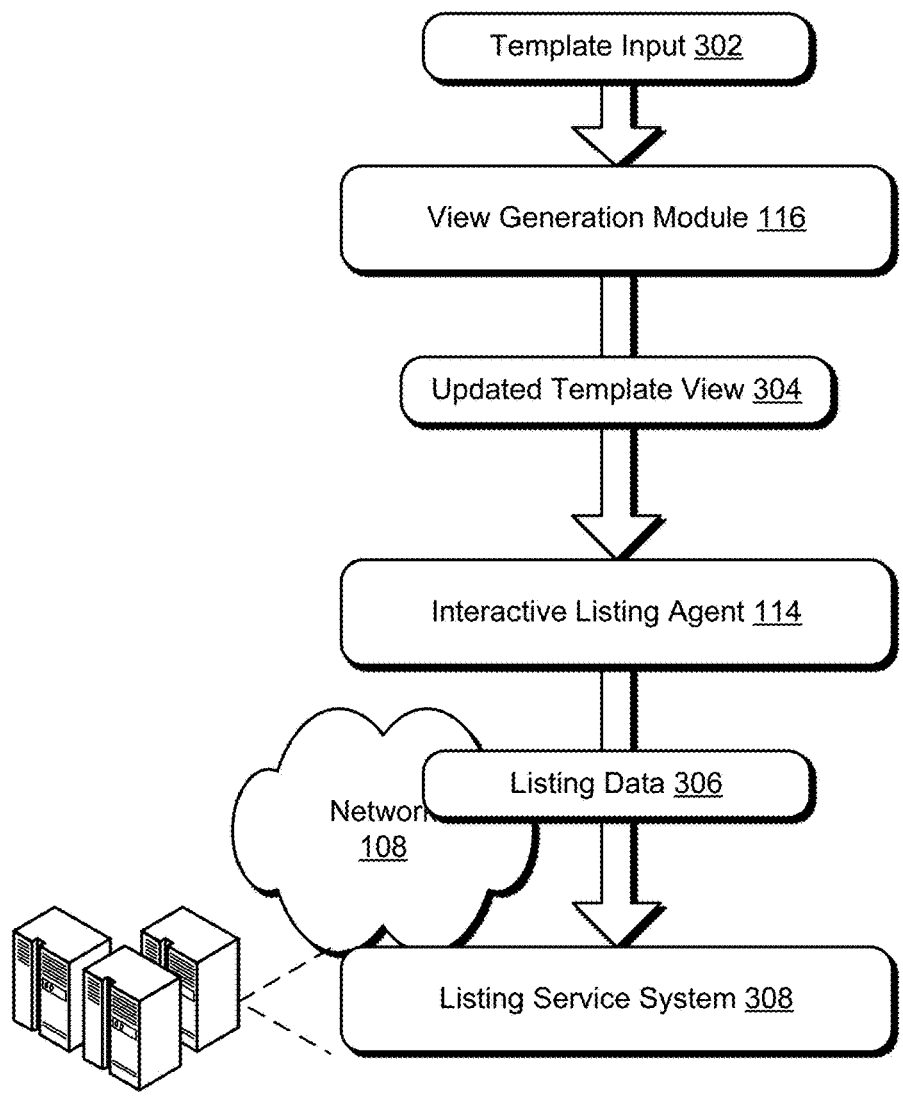
FIG. 3 depicts another example implementation in which the listing system of FIG. 1 generates a listing for communication to a listing service system based on information obtained in connection with the combined search result and listing template view.

FIG. 3 depicts a system in another example implementation 300 in which operation of the interactive listing agent 114 and the view generation module 116 is described in more detail as generating a listing for communication to a listing service system.

The interactive listing agent 114 and the view generation module 116 are incorporated as part of the system to generate the listing based on information obtained in connection with the combined search result and listing template view. In the example implementation 300, the view generation module 116 is illustrated obtaining template input 302. The template input 302 corresponds to computing device user inputs received via the result and listing template view 208 to modify the information presented via the listing template. One example of the template input 302, for instance, is a user input to change a digital image included in the result and listing template view 208 as part of the listing template. By way of example, the template input 302 may indicate to change an image copied to the listing template from the selected listing to an image maintained in the supplemental listing content 118. The template input 302 may indicate a variety of other changes to the listing template without departing from the spirit or scope of the techniques described herein, such as changes to a title, a description, a condition, a price of the product or service, and so on. Alternately or in addition, the template input 302 may indicate additions to the information in the listing template, such as to add additional information to a description, add additional images (e.g., to show different views or features of a listed product or service), add additional information regarding optional listing attributes, and so on.

Based on the template input 302, the view generation module 116 generates updated template view 304. In general, the updated template view 304 corresponds to an update of the result and listing template view 208. Like the result and listing template view 208, the updated template view 304 includes both the selectable listings 204 presented for selection and also the listing template. In contrast to the result and listing template view 208, however, the listing template of the updated template view 304 is updated according to the template input 302.

At some point, a user of the computing device 102 may decide that the information in the listing template accurately reflects the product or service that is to be listed. The user may thus select an option to submit the corresponding listing. Accordingly, a listing submission input is received via the updated template view 304 (or via the result and listing template view 208 if no template input is received to update the information of the listing template). Responsive to such input, the interactive listing agent 114 configures listing data 306. The interactive listing agent 114 configures the listing data 306 based, in part, on the information used to initially populate the result and listing template view 208. The interactive listing agent 114 also configures the listing data 306 based on the information received in connection with the template input 302. In one or more implementations, the interactive listing agent 114 configures the listing data 306 according to the defined attributes of a listing.

As illustrated, the interactive listing agent 114 may further communicate the listing data 306 over the network 108 to listing service system 308. The listing service system 308 represents functionality to expose the listing corresponding to the listing data 306 to a network of client device users. By way of example, the listing service system 308 may correspond to an electronic commerce platform (e.g., eBay®), a property rental platform (e.g., Airbnb®, VRBO®), a classified advertisements platform (e.g., Craigslist®), and so forth. The listing service system 308 is configured to leverage the listing data 306 to generate digital content configured as a listing and expose the listing to the client device users. The listing service system 308 may expose the listing via a variety of channels, examples of which include web pages, emails, network-enabled application interfaces, text messages, television, streaming media, and so on. These listings enable client device users to consume information about the listed product or service and also to act on the listing, e.g., buy the listed product or service, respond to a request for service or a job, and so on. In accordance with the principles discussed herein, consider now the implementation examples discussed in relation to FIGS. 4-9.

Figure 4:
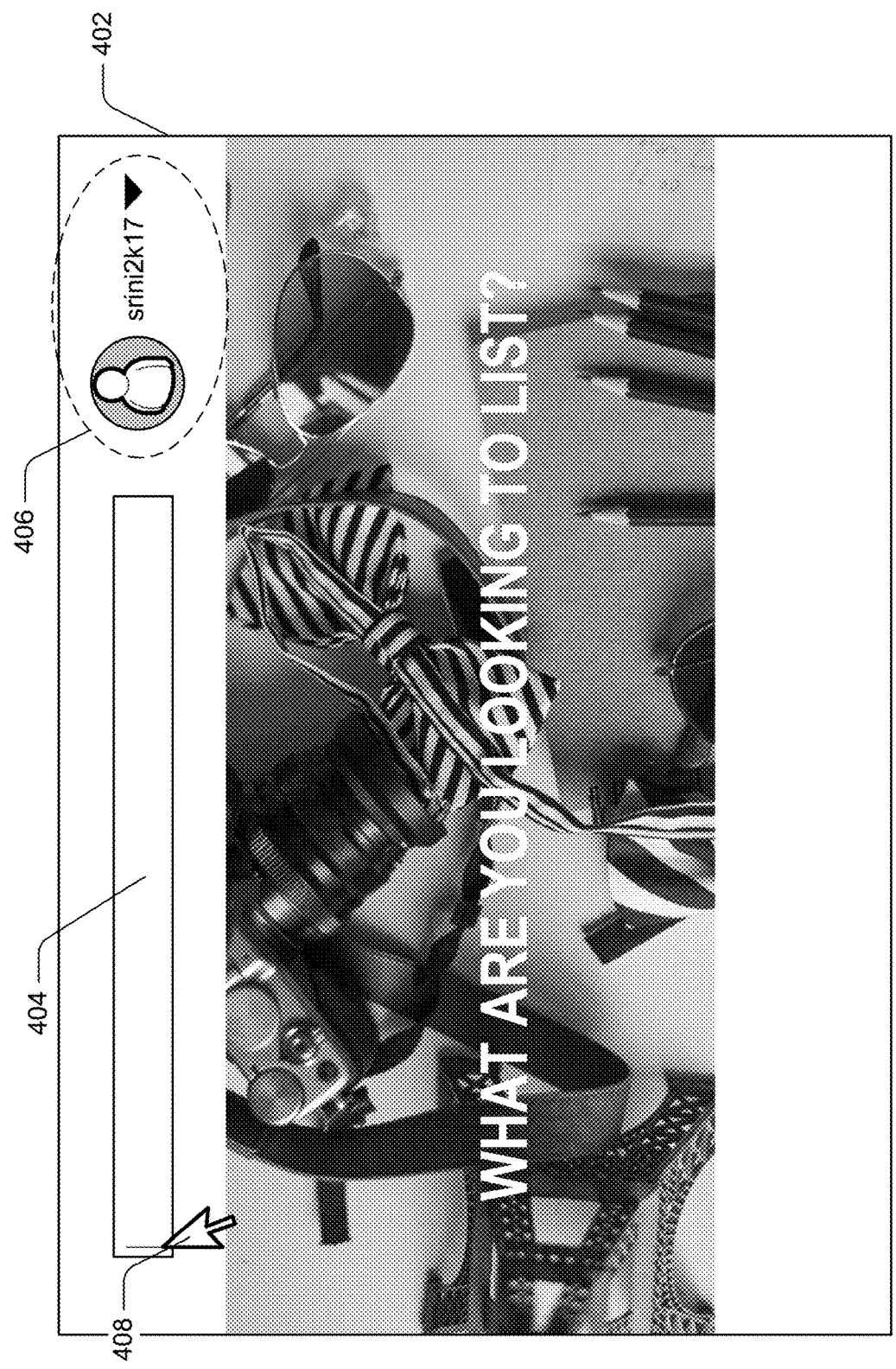
FIG. 4 depicts an example implementation of a user interface that is initially configured to receive a search query and that is further configurable to serve as the combined search result and listing template view.

FIG. 4 depicts an example implementation 400 in which a user interface is initially configured to receive a search query and is configurable to serve as a combined search result and listing template view. The illustrated example 400 includes user interface 402 having search query input bar 404 and user indication 406.

The illustrated example 400 is also depicted with cursor 408. In the following examples, the cursor 408 generally represents a focus of user input in relation to the user interface 402. In the illustrated example 400, for instance, the cursor 408 represents a focus of user input on the search query input bar 404, e.g., so that keyboard inputs cause text to be entered into the search query input bar 404. It is to be appreciated that the cursor 408 is merely representative of user input focus. In scenarios where user inputs are received using touch functionality or a stylus device, for instance, the cursor 408 may not be displayed in connection with the user interface 402. However, in scenarios involving mouse-based input the cursor 408 may nevertheless be displayed.

In general, the search query input bar 404 represents functionality to receive search query input. Although the following example is described in relation to text input, search query inputs in other forms may be used without departing from the spirit or scope of the techniques described herein, such as audio input, digital image input, video input (e.g., as in virtual or augmented reality), and so forth. The user indication 406 identifies a user profile that is currently authenticated to the listing system 112. In one or more implementations, the listing system 112 also uses this user profile in connection with exposing a listing via the listing service system 308. In relation to receiving search query input via the search query input bar 404, consider FIG. 5.

Figure 5:
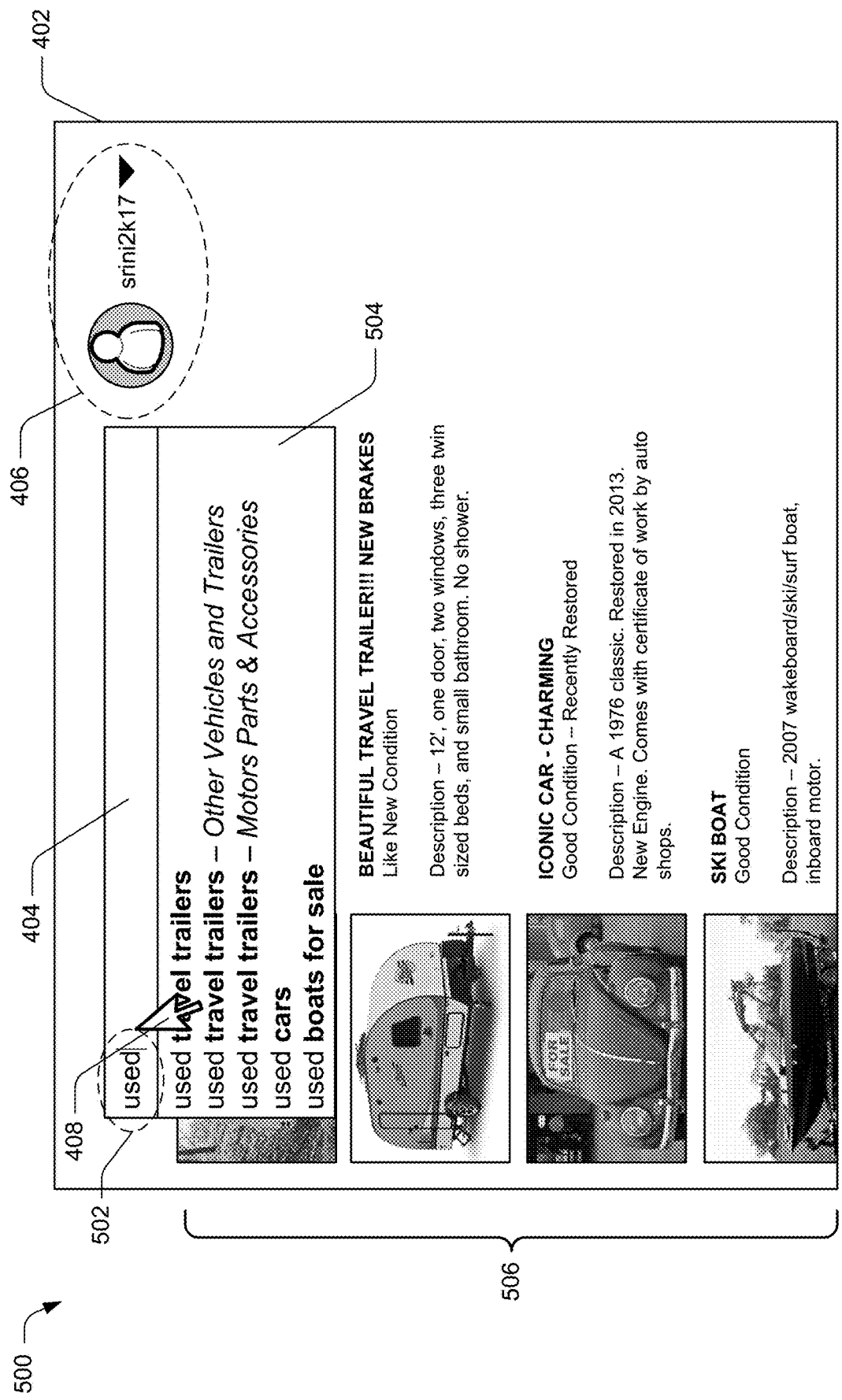
FIG. 5 depicts a further example implementation in which the user interface is updated to present search result listings as search query input is received.

FIG. 5 depicts another example implementation 500 in which the user interface 402 is updated to present search result listings as search query input is received. The illustrated example 500 is a continuation of FIG. 4 and thus includes components depicted therein.

In the illustrated example 500, the cursor 408 is illustrated proximate the search query input bar 404. This indicates that search query input is being received via the search query input bar 404. In particular, the search query input bar 404 is depicted having text 502, which is indicative of the search query input. The user interface 402 is also illustrated having search query predictions 504. The search query predictions 504 are indicative of a prediction regarding the search query input given the portion of search query input already entered, e.g., the text 502. Moreover, the search query predictions 504 are updated as more search query input is received, e.g., as more text is entered via the search query input bar 404. In one or more implementations, the search query predictions 504 are updated on a per-character basis, such that as input is received to enter each character, the search query predictions 504 are updated. In the illustrated example 500, the search query predictions 504 are predicted based on the text 502 string "used." In general, the search query input serves as a basis for performing a search to obtain the search results 202.

Based on the portion of the search query input already received, e.g., the text 502, selectable listings 506 are also presented via the user interface 402. In accordance with the principles discussed herein, the presented selectable listings 506 correspond to the selectable listings 204. The presented selectable listings 506 may thus be configured for presentation from the search results 202 as described in more detail above. Consequently, each of the selectable listings 506 is selectable to initiate display of a corresponding listing template in the result and listing template view 208. To illustrate further the functionality of updating the search query predictions 504 and the selectable listings as search query input is received, though, the example scenario is continued in relation to FIG. 6.

Figure 6:
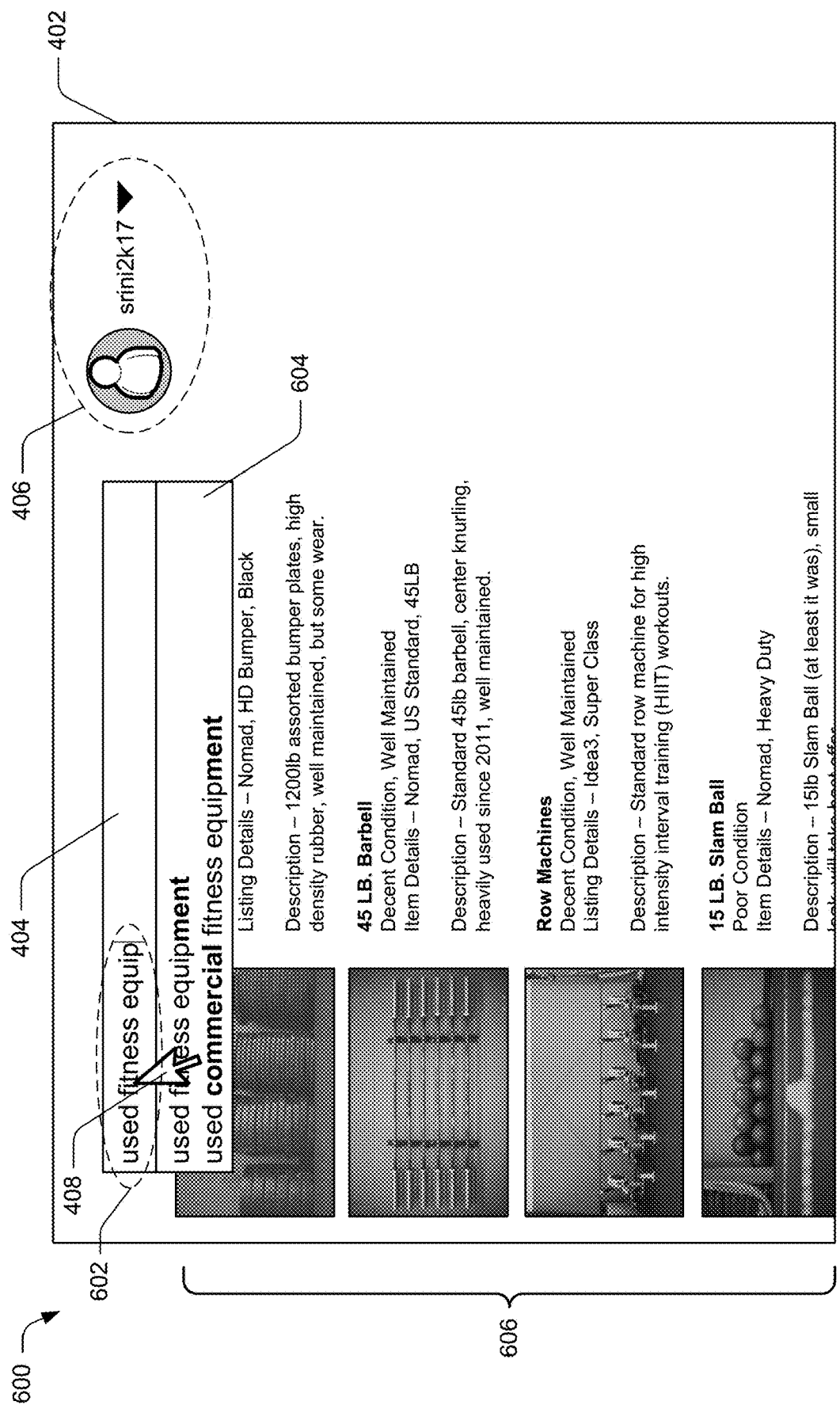
FIG. 6 depicts a further example implementation in which the user interface is updated to present different search result listings as additional search query input is received.

FIG. 6 depicts another example implementation 600 in which the user interface 402 is updated to present different search result listings as additional search query input is received. The illustrated example 600 is a continuation of FIG. 5 and thus includes components depicted therein.

In the illustrated example 600, the cursor 408 is again illustrated proximate the search query input bar 404. This indicates that search query input is being received via the search query input bar 404. In particular, the search query input bar 404 is depicted having text 602, which is indicative of the search query input at a second time that is after a first time associated with the text 502. Based on the additional search query input (e.g., as indicated by the text 602), the user interface may be configured to present different search query predictions 604. These are based on a prediction of the search query input given the portion of search query input already entered, e.g., the text 602. In relation to FIG. 5, more text has been received for the search query input. Accordingly, the different search query predictions 604 are further refined—there are fewer search query predictions depicted in FIG. 6 than in FIG. 5. In the illustrated example 600, the different search query predictions 604 are predicted based on the text 602 string "used fitness equip."

As in FIG. 5, selectable listings are presented based on the portion of the search query input received. In the illustrated example 600, however, the presented different selectable listings 606 are based on the text 602. In other words, the different selectable listings 606 are presented based on the text "used fitness equip" whereas the selectable listings 506 are presented based simply on the text "used." In accordance with the principles discussed herein, the presented different selectable listings 606 correspond to the selectable listings 204—but configured based on search results 202 returned as a result of using "used fitness equip" rather than simply "used." Accordingly, each of the different selectable listings 606 is also selectable to initiate display of a corresponding listing template in the result and listing template view 208. In other words, the user interface 402 is configurable as the result and listing template view 208. In this context, consider FIG. 7.

Figure 7:
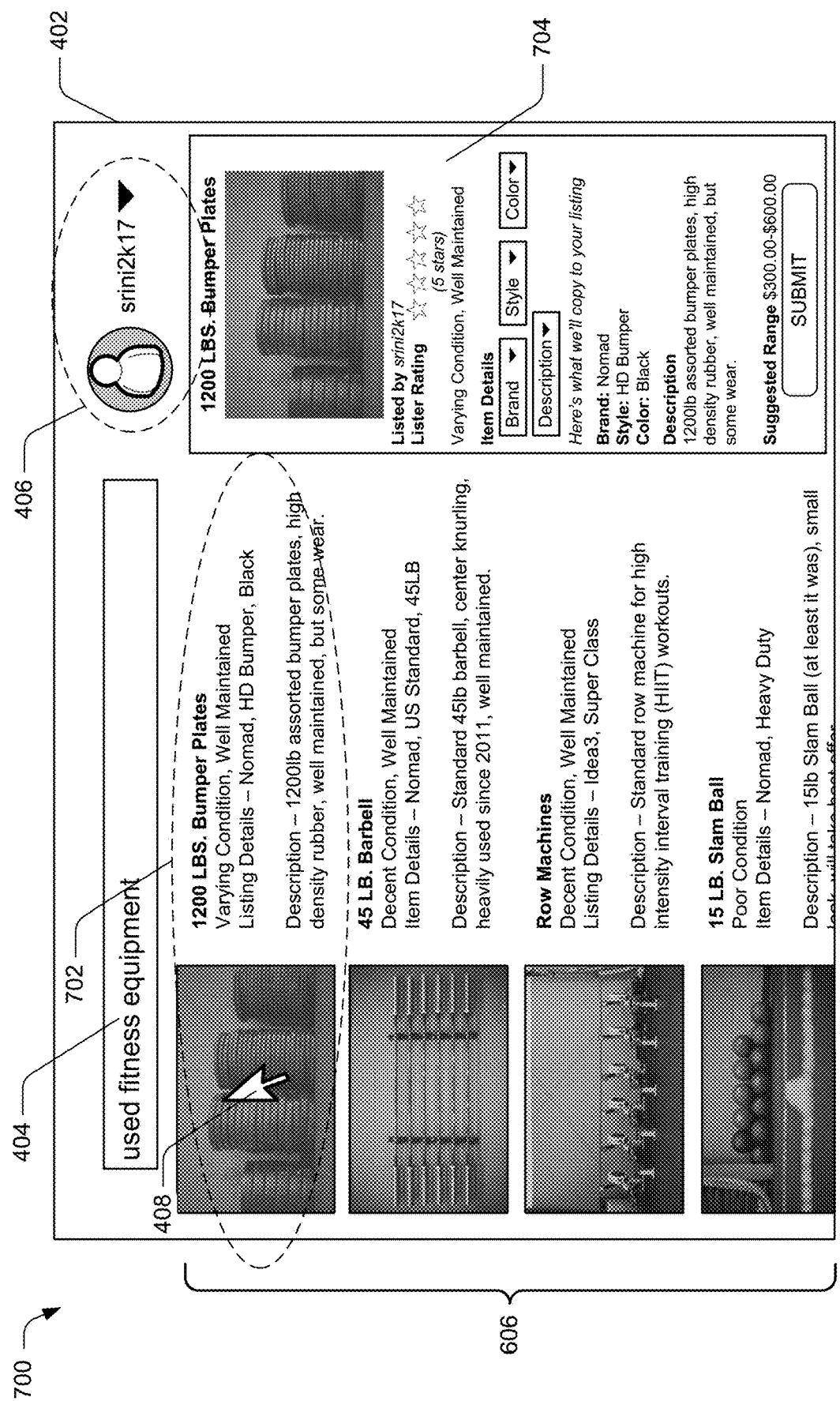
FIG. 7 depicts a further example implementation in which a listing template is presented along with the search result listings to form the combined search result and listing template view.

FIG. 7 depicts an example implementation 700 in which the user interface 402 is updated to include a listing template along with search result listings to form the combined search result and listing template view. The illustrated example 700 is a continuation of FIG. 6 and thus includes components depicted therein.

In the illustrated example 700, the cursor 408 is illustrated over selected listing 702. This indicates that the listing selection 206 is received to select the selected listing 702 from the different selectable listings 606. Based on selection of the selected listing 702, the user interface 402 is updated to include listing template 704, which is formed by incorporating data copied from the selected listing 702. In particular, the listing template 704 is formed by incorporating data that corresponds to defined attributes of a listing as discussed in relation to FIG. 8. In the illustrated example 700, for instance, the listing template 704 includes from the selected listing 702 a same title, image, condition of product or service, and item details (e.g., brand, style, color, and description). By configuring the listing template 704 to include this information, the listing system 112 reduces instances where client devices process information that is not arranged according to the defined attributes. This also makes listing products or services with a listing system easier for client device users.

In addition to the data incorporated from the selected listing 702, the listing template 704 also includes additional information, such as suggested pricing and information specific to the user profile associated with the potential listing. In the illustrated example 700, for instance, the listing template is generated to include a username of the listing user (e.g., 'srini2k17') and a rating associated with the listing user. In one or more implementations, the listing template 704 may be generated to include other user information, such as contact information (e.g., email address, telephone number, and so on) associated with the listing user. The interactive listing agent 114 may obtain this contact information from a profile of the user corresponding to the user indication 406. In the illustrated example 700, the listing template 704 is also depicted with a suggested range of prices, which may correspond to prices at which similar products or services have sold over some threshold of time, e.g., the last 90 days. It is to be appreciated that the listing template 704 may be configured to include other information without departing from the spirit or scope of the techniques described herein. For instance, search result listings presented in accordance with the described techniques may include different information, which may therefore be carried to the listing template 704. Regardless of the particular data included, the listing template 704 is generally configured according to defined attributes for a listing. In this context, consider FIG. 8.

Figure 8:
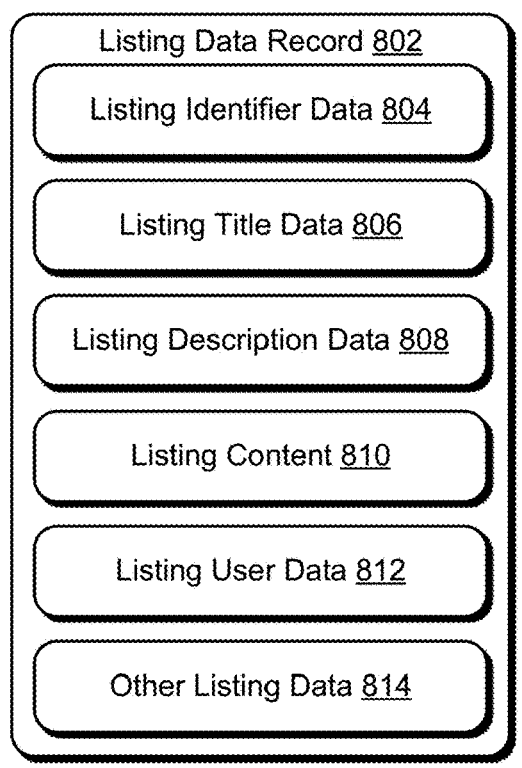
FIG. 8 depicts an example implementation of a data structure that is usable to implement a schema for generating listing templates from search results to enable the combined view.

FIG. 8 depicts an example implementation 800 of a data structure that is usable to implement a schema for generating listing templates from search results to enable the combined view. In particular, the example 800 includes listing data record 802, which is depicted with attributes controlled by a set of rules defined by the schema for describing listings.

Broadly speaking, the attributes of the listing data record 802 control the data that is identified from selected search result listings and incorporated into a listing template. The listing system 112 can also use these attributes to control the listing data 306 communicated to the listing service system 308 for exposing a listing to client devices. Given this, consider the example attributes of the illustrated listing data record 802. The listing data record 802 is depicted including listing identifier data 804, listing title data 806, listing description data 808, listing content 810, listing user data 812, and other listing data 814.

In general, the listing identifier data 804 uniquely identifies the listing corresponding to the listing data record 802. By way of example, the listing identifier data 804 may correspond to a random global unique identifier (GUID) associated with the listing or some other mechanism to uniquely distinguish the listing (and information associated therewith) from other listings. The listing title data 806 corresponds to a title of the respective listing. With reference to FIG. 7, for instance, the listing title data 806 for the selected listing 702 corresponds to the text string '1200 LBS. Bumper Plates.'

The listing description data 808 corresponds to a description for the respective listing. With reference again to FIG. 7, the listing description data 808 for the selected listing 702 corresponds to the text beginning with '12001*b* assorted bumper plates . . . .' In one or more implementations, the listing description data 808 may not be configured as text. Instead, the listing description data 808 may be configured as a video or as audio describing a listed product or service. The listing content 810 corresponds to digital content capable of further describing or otherwise indicating features of the corresponding listing. By way of example, the listing content 810 may be configured as a digital image. The listing content 810 may include one or more digital content items as well as different types of digital content (e.g., videos, audio, graphics, and so forth) without departing from the spirit or scope of the described techniques.

The listing user data 812 corresponds to data associated with a user profile corresponding to the listing. As indicated in FIG. 7, the listing user data 812 may include a username of the listing user and a rating associated with the listing user. As indicated above, the listing user data 812 may include different information about a listing user without departing from the spirit or scope of the techniques described herein. The listing data record 802 is also depicted with other listing data 814. Indeed, the interactive listing agent 114 may generate listing data records to include other information, such as a condition of a listed product or service (e.g., excellent condition, like new, good condition, poor condition, and so on), item details (e.g., brand, style, color, fit, size, and so on), pricing information (e.g., a suggested range of listing prices), maintenance information, and so forth. It should be appreciated that the listing data record 802 may be configured with different combinations of attributes than illustrated without departing from the spirit or scope of the techniques described herein.

Regardless of the particular attributes of the listing data record 802, the attributes are usable to govern how the data presented in the listing template 704 can be modified. With reference to modifying data presented as part of the listing template 704, consider FIG. 9.

FIG. 9 depicts an example implementation 900 in which user input is received via the user interface 402 to modify the information in a listing template. The illustrated example 900 is a continuation of FIG. 7 and thus includes components depicted therein.

In the illustrated example, the cursor 408 is illustrated over attribute modification instrumentality 902, which in this scenario enables a user of the computing device 102 to provide input to modify the listing description data 808 associated with the listing template 704. In one or more implementations, this attribute modification instrumentality 902 is presented responsive to a user input proximate the corresponding data, such as hovering over the description or selecting the description instrumentality depicted in FIG. 7, tapping over the description with a finger or stylus or on the description instrumentality depicted in FIG. 7, and so on. Once presented, the attribute modification instrumentality 902 enables the indicated data to be modified. Consider another example in which user input is received to hover over or otherwise select the image of the listing template 704. In this example, an attribute modification instrumentality that enables the image to be swapped with a different image (e.g., a digital image from the supplemental listing content 118) is presented.

In general, these inputs correspond to the template input 302. Accordingly, when the template input 302 is received via attribute modification instrumentalities, the view generation module 116 generates the updated template view 304 to include the modified information. Additionally, the interactive listing agent 114 updates the listing data record 802 corresponding to the listing template 704. The illustrated example 900 also includes listing submission instrumentality 904. Responsive to user selection of the listing submission instrumentality 904, the interactive listing agent 114 is configured to communicate at least some of the data of the corresponding listing data record 802 to the listing service system 308 as the listing data 306.

Having discussed example details of the techniques for search result-based listing generation in a single view, consider now some example procedures to illustrate additional aspects of the techniques.

Example Procedures

This section describes example procedures for search result-based listing generation in a single view in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 having a listing system 112 that makes use of an interactive listing agent 114 and a view generation module 116, or devices implemented as the example systems 200 and/or 300 of FIGS. 2 and 3, which also make use of those modules.

Figure 10A:
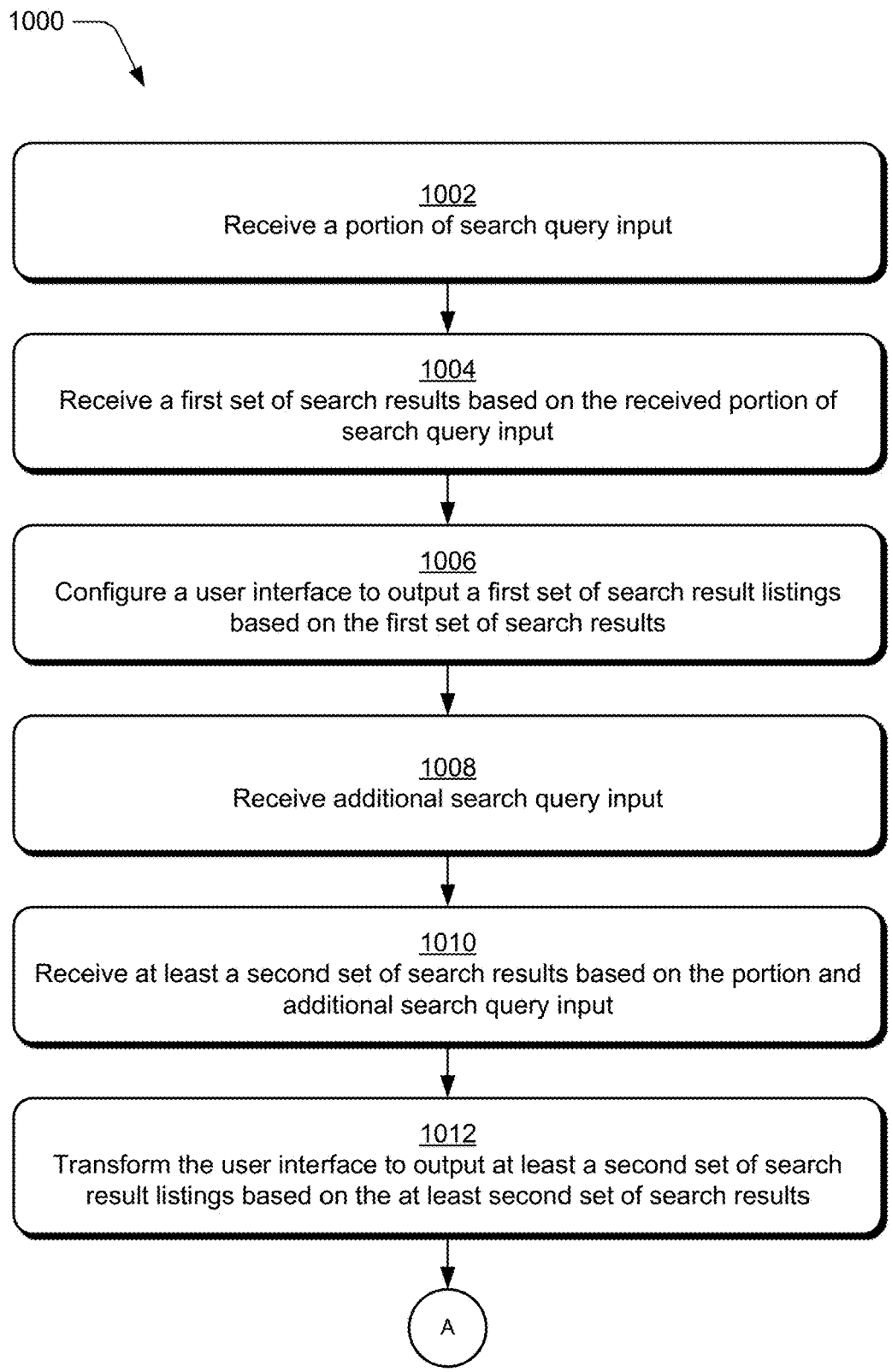
FIGS. 10A and 10B depict a procedure in an example implementation in which a listing template is presented in a single view with search result listings and in which the listing template is configured based on a user-selected search result listing.
Figure 10B:
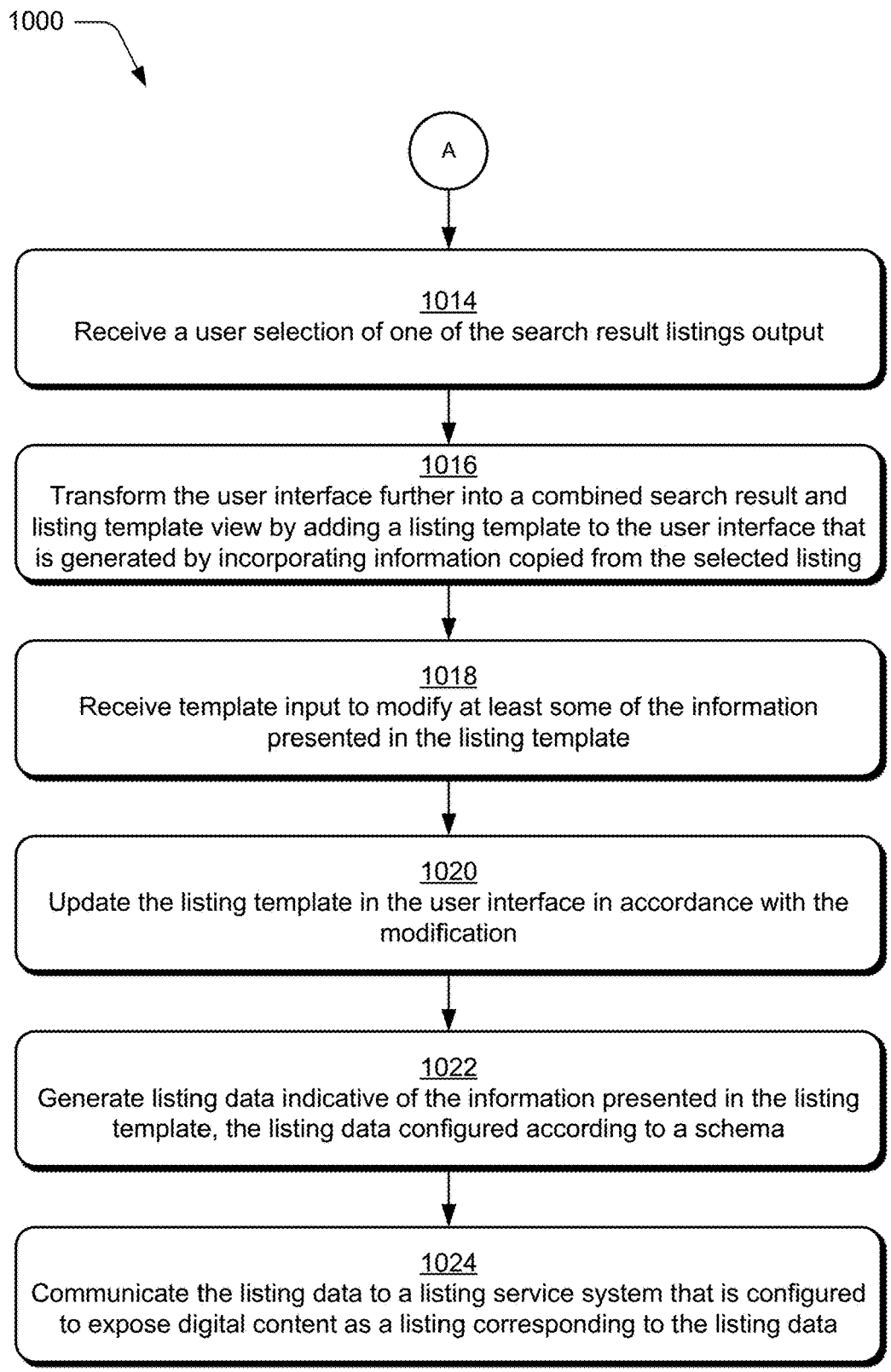

FIGS. 10A and 10B depict an example procedure 1000 in which a listing template is presented in a single view with search result listings and in which the listing template is configured based on a user-selected search result listing.

A portion of a search query input is received (block 1002). By way of example, one of the applications 110 receives the text 502 via the search query input bar 404 of the user interface 402. A first set of search results is received based on the received portion of the search query input (block 1004). By way of example, the search results 202 corresponding to the text 502 are received from the search service manager module 106 by the interactive listing agent 114. A user interface is configured to output a first set of search result listings based on the first set of search results (block 1006). By way of example, the interactive listing agent 114 configures the first set of search results received at block 1004 as selectable listings 204. The view generation module 116 configures the user interface 402 to output these, such as the selectable listings 506 are output via the user interface 402 in FIG. 5.

Additional search query input is received (block 1008). By way of example, the one application 110 receives the text 602 via the search query input bar 404 of the user interface 402. In accordance with the principles discussed herein, the text 602 includes additional characters in relation to the text 502 and thus corresponds to the additional search query input. At least a second set of search results is received based on the portion and additional search query input (block 1010). By way of example, the search results corresponding to the text 602 are received from the search service manager module 106 by the interactive listing agent 114. The user interface is transformed to output at least a second set of search result listings based on the at least second set of search results (block 1012). By way of example, the interactive listing agent 114 configures the second set of search results received at block 1010 as selectable listings 204. The view generation module 116 configures the user interface 402 to output these, such as the different selectable listings 606 are output via the user interface 402 in FIG. 6. The procedure 1000 continues at 'A' from FIG. 10A to FIG. 10B.

A user selection is received to select one of the presented search result listings (block 1014). By way of example, the listing selection 206 is received to select the selected listing 702 from the different selectable listings 606 presented via the user interface 402. In one or more implementations, the listing selection 206 to select the selected listing 702 corresponds to a mouse-based selection involving the cursor 408. Additionally or alternately, the listing selection 206 corresponds to a touch-based selection using touch functionality, a voice-based selection using voice recognition functionality, a gesture-based selection using gesture recognition functionality, a stylus-based selection, a keyboard-based selection, and so forth.

The user interface is further transformed into a combined search result and listing template view (block 1016). In accordance with the principles discussed herein, the listing template that is added to the user interface is configured to include information copied from the selected search result listing. By way of example, the view generation module 116 transforms the user interface 402 into the result and listing template view 208 by generating the listing template 704 and incorporating the listing template 704 for display as part of the user interface 402. In so doing, the view generation module 116 configures the user interface 402 to present both the different selectable listings 606 and the listing template 704 concurrently. As described in more detail above, the listing system 112 configures the listing template 704 to include information copied from the selected listing 702.

Template input is received to modify at least some of the information presented in the listing template (block 1018). By way of example, the view generation module 116 receives the template input 302 to modify at least some of the information presented in the listing template 704. With reference to FIG. 9, the view generation module 116 receives the template input 302 in relation to the attribute modification instrumentality 902 to modify the listing template 704's description. Certainly, the template input 302 may be received to modify different information of the listing template 704 in accordance with the described techniques.

The listing template is updated in the user interface in accordance with the modifications (block 1020). By way of example, the view generation module 116 updates the listing template 704 in the user interface 402 in accordance with the modifications of block 1018. Accordingly, the view generation module 116 generates the updated template view 304 of the user interface 402, which includes the listing template 704 as modified by the modifications of block 1018.

Listing data is generated that is indicative of the information presented in the listing template (block 1022). In accordance with the principles described herein, the listing data is configured according to a schema that controls the attributes of a listing. By way of example, the interactive listing agent 114 generates the listing data 306 responsive to selection of the listing submission instrumentality 904. The interactive listing agent 114 configures the listing data 306 according to a schema, such as a schema specifying that listings are to have the attributes represented by the listing data record 802. Moreover, the interactive listing agent 114 generates the listing data 306 so that it is indicative of the information presented in the listing template 704 at a time the listing submission instrumentality 904 is selected.

The listing data is communicated to a listing service system (block 1024). In accordance with the principles discussed herein, the listing service system is configured to expose digital content as a listing corresponding to the listing data. By way of example, the interactive listing agent 114 communicates the listing data 306 to the listing service system 308. The listing service system 308 generates digital content as a listing corresponding to the listing data 306 and exposes the listing, e.g., the listing service system 308 surfaces the listing to client devices in response to search query inputs pertinent to the listing.

Having described example procedures in accordance with one or more implementations, consider now an example system and device that can be utilized to implement the various techniques described herein.

Example System and Device

Figure 11:
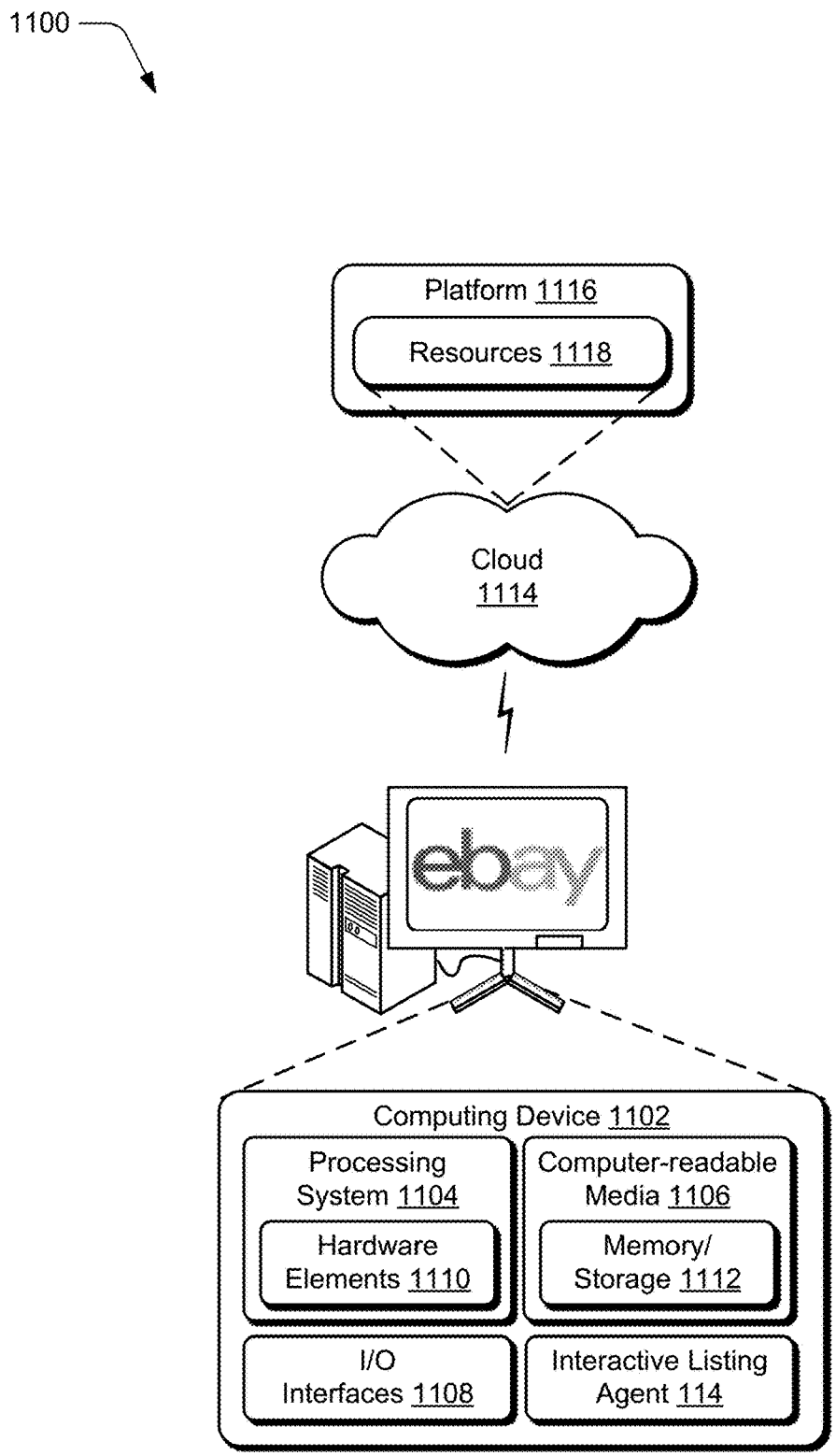
FIG. 11 illustrates an example system including various components of an example device that can be implemented as any type of computing device as described and/or utilized with reference to FIGS. 1-10B to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the interactive listing agent 114. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   presenting, by the at least one computing device, a user interface with search result listings;
   receiving, by the at least one computing device, a selection of a presented search result listing;
   identifying, by the at least one computing device, information associated with the selected search result listing that corresponds to attributes specified by a listing schema; and
   configuring, by the at least one computing device, the user interface to present a modifiable listing template concurrently with the search result listings as reference, the modifiable listing template including the information identified, and the information being modifiable based on user input via attribute modification instrumentalities displayed in the modifiable listing template.

2. A method as described in claim 1, further comprising receiving template input via an attribute modification instrumentality to modify the information in the modifiable listing template.

3. A method as described in claim 1, further comprising:
receiving a listing submission input via the user interface;
responsive to the listing submission input, generating a listing based on the information in the modifiable listing template; and
communicating the listing to a distribution platform configured to expose the listing to one or more client devices.

4. A method as described in claim 1, wherein the attributes specified by the listing schema include at least one of:
a listing title;
a listing description;
listing content; or
a condition of a listed product or service.

5. A method as described in claim 1, wherein the modifiable listing template further includes listing-user information identified from a user profile associated with the modifiable listing template.

6. A method as described in claim 5, wherein the listing user information includes at least one of:
a username corresponding to the user profile;
a listing user rating associated with the user profile; or
contact information associated with the user profile.

7. A method as described in claim 1, further comprising:
receiving search query input via the user interface;
receiving search results from a search engine based on the search query input; and
configuring the search result listings for presentation via the user interface based on the search results.

8. A method as described in claim 1, wherein one or more of the search result listings presented are exposed by a distribution platform further configured to expose a listing generated based on the modifiable listing template.

9. A method as described in claim 1, further comprising:
receiving a first portion of search query input via the user interface;
receiving a first set of search results from a search engine based on the first portion of search query input; and
configuring a first set of the search result listings for presentation via the user interface based on the first set of search results.

10. A method as described in claim 9, further comprising:
receiving additional search query input via the user interface;
receiving at least a second set of search results from the search engine based on the first portion and the additional search query input; and
configuring at least a second set of the search result listings for presentation via the user interface based on the at least second set of search results.

11. A method as described in claim 1, wherein the presented search result listings are from different sources and each presentation of a search result listing from a different source conforms to the listing schema, and the listing schema is configured for identifying information associated with any selected search result listing from the different sources and as corresponding to the attributes specified by the listing schema.

12. A method as described in claim 11, wherein the different sources are different service providers.

13. A system comprising:
at least one processor; and
memory having stored thereon computer-readable instructions that are executable by the at least one processor to perform operations comprising:
generating a user interface to present search results based on search query input; and
transforming the user interface based on selection of a presented search result to present a modifiable listing template concurrently with the search results as reference, the modifiable listing template including information copied from a selected search result and a listing submission instrumentality that is selectable to expose a listing via a distribution platform based on the information included in the modifiable listing template.

14. A system as described in claim 13, wherein the operations further comprise:
receiving template input to modify the information included in the modifiable listing template; and
transforming the user interface further to present the modifiable listing template with modified information in accordance with the template input.

15. A system as described in claim 13, wherein the operations further comprise:
receiving input to select the listing submission instrumentality;
generating the listing based on the information included in the modifiable listing template; and
communicating the listing to the distribution platform configured to expose the listing.

16. A system as described in claim 13, wherein:
the instructions are executable to implement an interactive listing agent to perform the operations; and
the system further comprises at least two applications configured to employ the interactive listing agent to perform at least a portion of the generating and the transforming.

17. A method implemented by at least one computing device, the method comprising:
receiving a first portion of search query input via a user interface;
receiving a first set of search results from a search engine based on the first portion of search query input;
presenting a first set of search result listings via the user interface, the first set of search result listings conforming to a listing schema, originating from different sources, and including information identified from respective results of the first set of search results and as corresponding to attributes specified by a listing schema, and wherein each presentation of a search result listing originating from a different source conforms to the listing schema;
receiving additional search query input via the user interface;
receiving at least a second set of search results from the search engine based on the first portion and the additional search query input;
presenting at least a second set of search result listings via the user interface, the at least second set of search result listings conforming to the listing schema, originating from the different sources, and including information identified from respective results of the second set of search results and as corresponding to the attributes specified by the listing schema;
receiving a selection of a presented search result listing from the at least second set of search result listings; and
presenting a modifiable listing template via the user interface concurrently with the at least second set of search result listings, the modifiable listing template formed, in part, by copying information from the selected search result listing to the modifiable listing template.

18. A method as described in claim 17, wherein:

the first portion and the additional search query input comprise text input; and the at least second set of search results is received on a character-by-character basis in connection with receipt of the text input.

19. A method as described in claim 17, further comprising:

receiving non-textual search query input to initiate a search;

receiving at least a third set of search results from the search engine based on the non-textual search query input; and presenting at least a third set of search result listings via the user interface, the at least third set of search result listings conforming to the listing schema, originating from the different sources, and including information identified from respective results of the third set of search results and as corresponding to the attributes specified by the listing schema.

20. A method as described in claim 17, wherein the different sources are different service providers.

* * * * *